United States Patent
Searfoss (10) Patent No.: US 10,155,435 B2
(45) Date of Patent: Dec. 18, 2018

(54) SIDE-TO-SIDE COVER SYSTEM

(71) Applicant: Aero Industries, Inc., Indianapolis, IN (US)

(72) Inventor: Timothy K. Searfoss, West Branch, MI (US)

(73) Assignee: Aero Industries, Inc., Indianapolis, IN (US)

( * ) Notice: Subject to any disclaimer, the term of this patent is extended or adjusted under 35 U.S.C. 154(b) by 121 days.

(21) Appl. No.: 15/351,740

(22) Filed: Nov. 15, 2016

(65) Prior Publication Data

US 2017/0144519 A1 May 25, 2017

Related U.S. Application Data

(60) Provisional application No. 62/386,294, filed on Nov. 25, 2015.

(51) Int. Cl.
*B60J 7/08* (2006.01)

(52) U.S. Cl.
CPC ..................... *B60J 7/085* (2013.01)

(58) Field of Classification Search
CPC .......................................... B60J 7/085
USPC ................. 296/98, 100.14, 100.15, 100.16
See application file for complete search history.

(56) References Cited

U.S. PATENT DOCUMENTS

| | | | | |
|---|---|---|---|---|
| 6,199,935 B1 * | 3/2001 | Waltz | ....................... | B60J 7/085 296/100.14 |
| 6,779,828 B1 * | 8/2004 | Poyntz | ..................... | B60J 7/085 296/100.11 |
| 6,783,168 B2 * | 8/2004 | Searfoss | ................... | B60J 7/085 296/100.11 |
| 7,188,887 B1 * | 3/2007 | Schmeichel | ............. | B60J 7/085 296/100.14 |
| 7,513,561 B2 * | 4/2009 | Royer | ...................... | B60J 7/085 296/100.01 |
| 7,866,725 B1 * | 1/2011 | Searfoss | ................... | B60J 7/085 296/100.14 |
| 8,998,287 B2 * | 4/2015 | Smith | ....................... | B60J 7/085 296/98 |
| 2003/0090124 A1 * | 5/2003 | Nolan | ....................... | B60J 7/085 296/98 |
| 2010/0230993 A1 * | 9/2010 | Bremer | .................... | B60J 7/085 296/98 |
| 2010/0230994 A1 * | 9/2010 | Royer | ...................... | B60J 7/085 296/100.16 |

* cited by examiner

*Primary Examiner* — Jason S Morrow
*Assistant Examiner* — E Turner Hicks
(74) *Attorney, Agent, or Firm* — Maginot, Moore & Beck, LLP (57) ABSTRACT

A cover system for an open-topped container body includes a cover assembly supported by a first arm assembly pivotably mounted at one end of the container body and a second arm assembly mounted at the opposite end of the body. The first arm assembly is coupled to one end of the cover assembly and includes a drive motor for rotating the cover assembly between deployed and retracted positions. The second arm assembly includes an arm pivotably mounted to the container body, a chain connected at one end to the free end of the arm, and an engagement element connected at the opposite end of the chain that is coupled to the opposite end of the cover assembly.

24 Claims, 9 Drawing Sheets

SIDE-TO-SIDE COVER SYSTEM

REFERENCE TO RELATED APPLICATION AND PRIORITY CLAIM

This application is a utility filing of and claims priority to provisional application No. 62/386,294, filed on Nov. 25, 2015, the entire disclosure of which is incorporated herein in its entirety.

BACKGROUND

The present disclosure relates to cover systems for open-topped containers, such as dump bodies, refuse haulers, grain trailers and the like. These cover systems utilize flexible covers, such as tarpaulins, that are pulled across the open top of the container body. The flexible cover is wound onto a roller as the cover is moved to its open or stowed position and unwound from the roller as the cover is moved to a closed position covering the container body. An arm assembly supports the opposite ends of the flexible to control the movement of the cover to and from its end positions.

Figure 1:
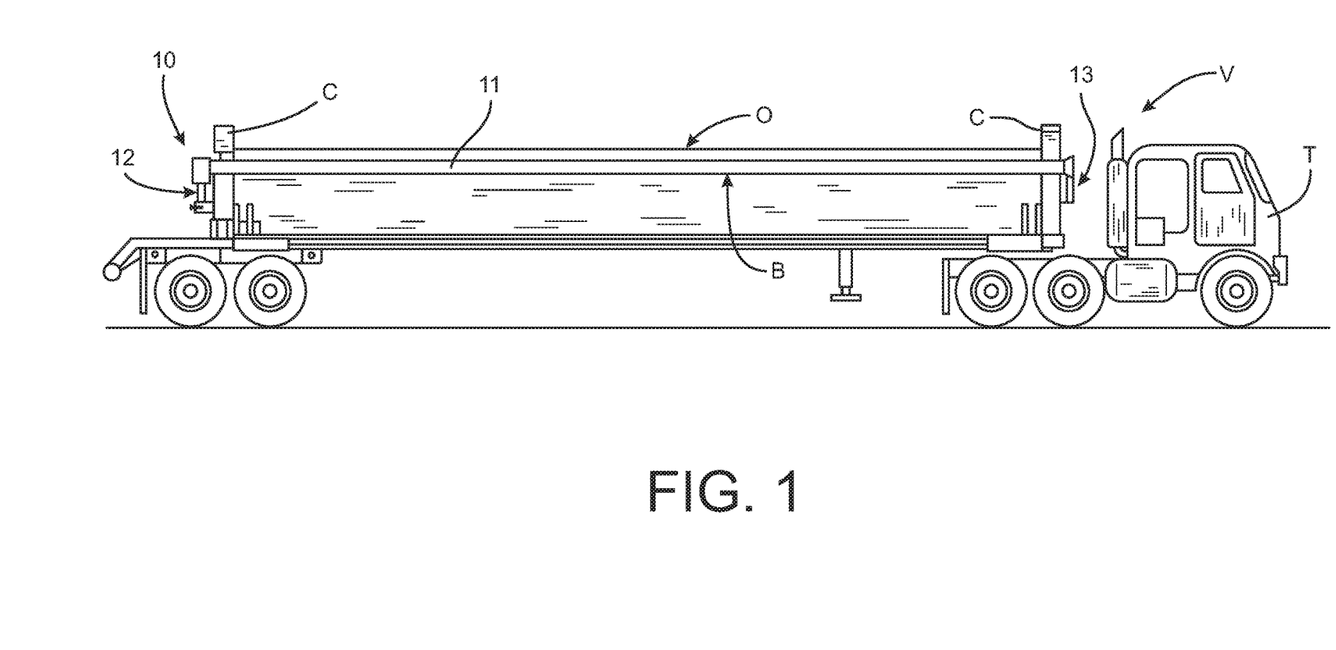
FIG. 1 is a side view of an exemplary side-to-side cover system for the open top of a trailer body.

An exemplary side-to-side system is depicted in FIG. 1. The Vehicle V includes a tractor T and a trailer body B, which may be a dump body, grain hauler and the like. A tarping system 10 is mounted to the trailer with a cover or tarpaulin 11 sized to extend the entire length of the open top O of the trailer body, and to span the width of the open top when the tarping system is in its closed configuration. A drive mechanism 12 is engaged to a roller supporting the cover 11 that is configured to move the cover from one side of the trailer body B to the other. A support mechanism 13 is engaged to the opposite end of the cover roller to support the cover as it is deployed or retracted. In a typical side-to-side cover system, the drive mechanism 12 rotates the roller and cover so that the cover travels over the end caps C of the trailer body.

SUMMARY OF THE DISCLOSURE

The present disclosure contemplates a side-to-side cover system comprising an elongated cover assembly sized and configured to span a length of the open top of the container and to span the width of the open top of the container in a deployed position, a first arm assembly pivotably mountable at one end of the container body, the arm assembly configured to be coupled to one end of the cover assembly and including a drive motor for rotating the cover assembly between the deployed position spanning the width of the open top and a retracted position in which the open top is open; and a second arm assembly mountable at an opposite end of the container body, the second arm assembly including an arm pivotably mountable at one end to the container body, a chain connected at one end to the opposite end of the arm, and an engagement element connected at the opposite end of the chain and configured to be coupled to the opposite end of the cover assembly.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 2:
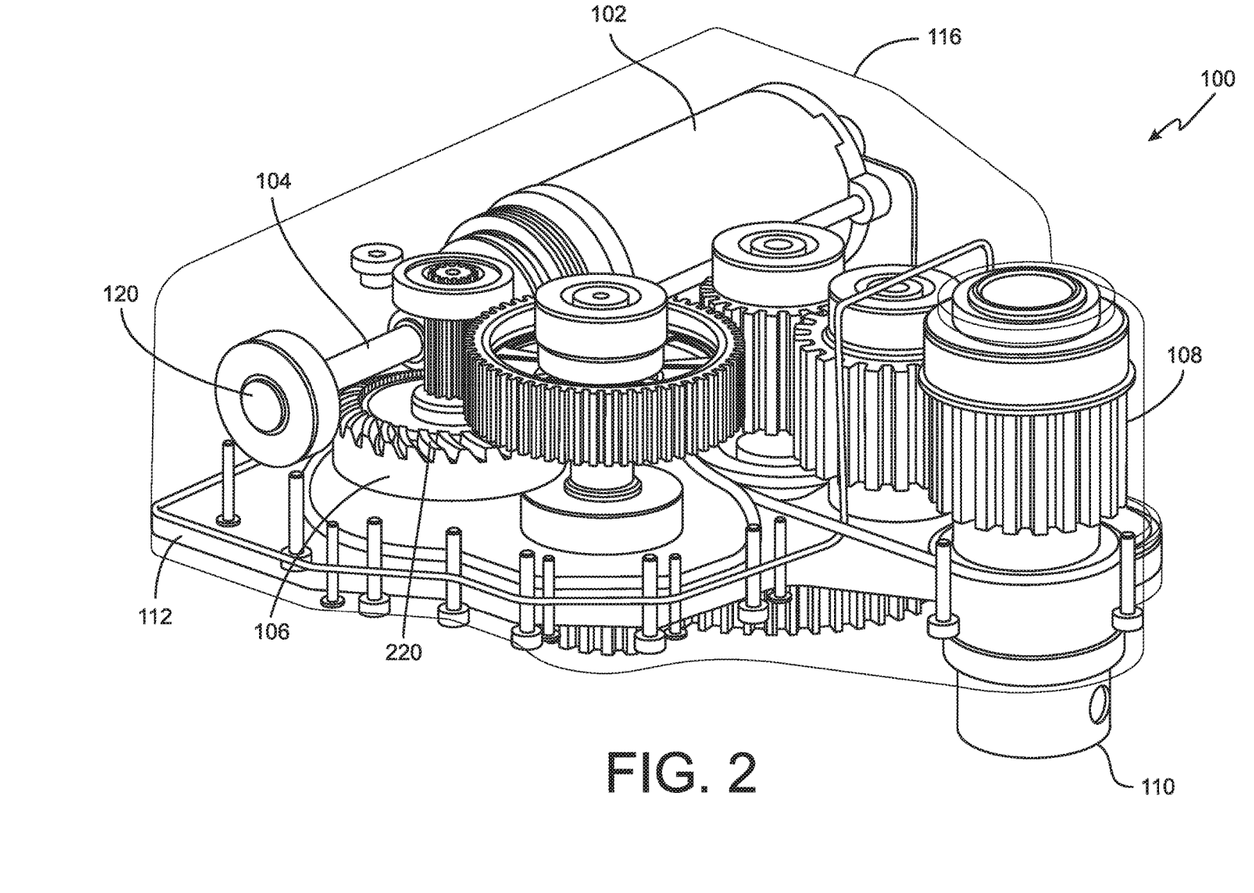
FIG. 2 is a perspective cut-away view of a gear motor for the drive mechanism of the cover system such as the drive mechanism 12 of the cover system shown in FIG. 1.
Figure 3:
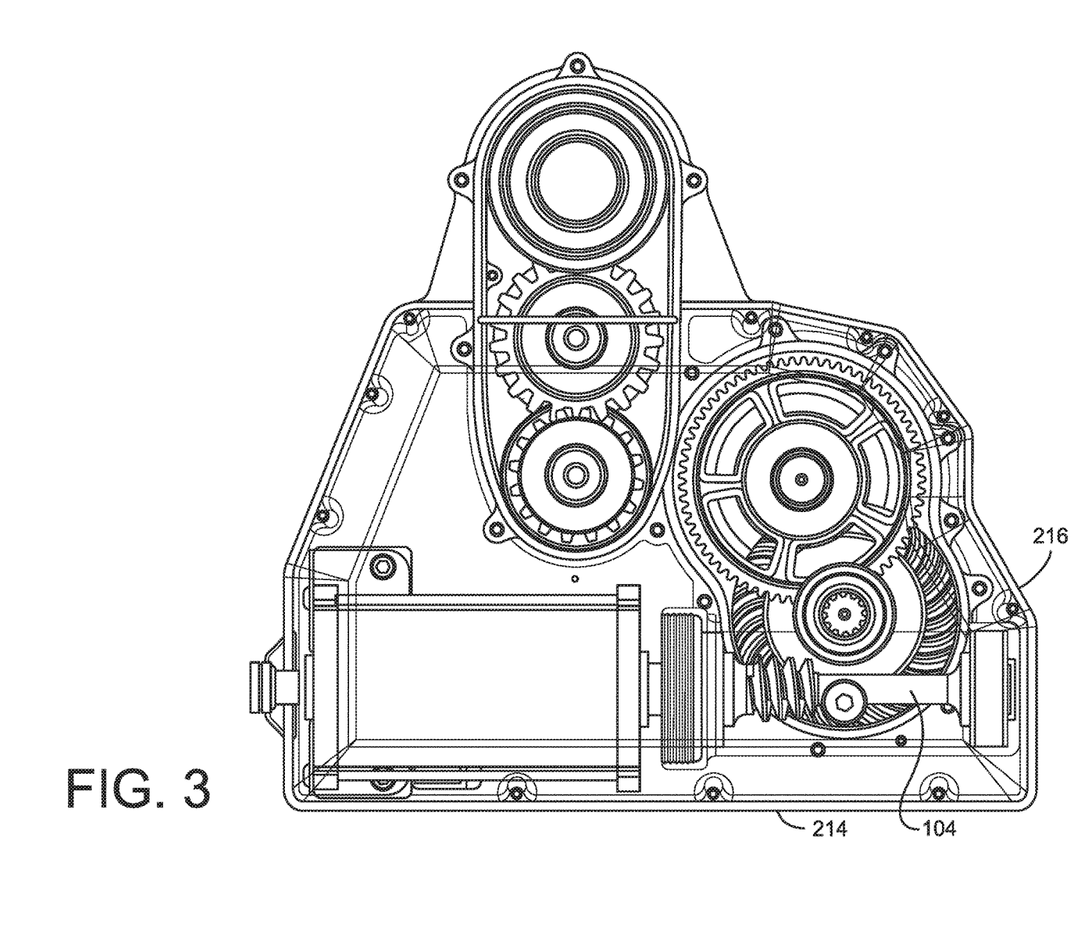
FIG. 3 is a front cut-away view of the gear motor shown in FIG. 2.

FIGS. 2-3 show a gear motor 100 including an electric motor 102, a pinion 104, a ring gear 106, and an output gear 108 having output shaft 110 with a polymer insert (not shown) through which an output shaft may be pinned. In various embodiments, the motor 102 can be a universal motor, and can include stator field coils and rotor windings connected in parallel through a commutator. As such, the motor 102 can be free of permanent magnets. The motor 102 can be operated using either direct current (DC) or alternating current (AC). The motor 102 is preferably run using DC power.

Gear motor 100 can include a housing plate 112, an internal housing case 114, and an external cover 116 having a lower section and an upper section. In various embodiments, internal housing case 114 can form a sealed cavity. Pinion 104 and ring gear 106 can be enclosed by the sealed cavity formed by internal housing case 114. The sealed cavity can be filled with a lubricant such as hypoid oil to inhibit wear of the internal gears. Additionally, external cover 116 and housing plate 112 can form a second sealed cavity enclosing motor 102, output gear 108, and the sealed cavity with pinion 104 and ring gear 106. The second sealed cavity can protect the motor from dust and water. The electric motor 102 is disposed substantially entirely within the housing.

Pinion 104 can be mounted on a shaft of motor I-02. Pinion 104 can include hypoid teeth 214, bearing region 216, and an opposite bearing region. The ring gear 106 can include hypoid gear teeth portion 220. The ring gear 106 is carried by the pinion shaft containing a bearing region that in various embodiments can have a spur teeth pattern or a helical spur tooth pattern. Output gear 108 can have a straight or helical toothed edge. In various embodiments, pinion 104 and ring gear 106 can be high ratio hypoid gears that self-lock to hold position when the motor is not running. The high ratio hypoid gear set can have a ratio of 15:1 or higher, and preferably of 30:1.

Motor 102 can rotate pinion 104 which can cause rotation of ring gear 106, leading to rotation of intermediate gears and thus output gear 108, in turn rotating the output shaft. In various embodiments, motor 102 can be operable in a clockwise or counter-clockwise direction, thereby reversing the direction of rotation of the output shaft 110. Additionally, the high ratio hypoid relationship between the pinion 104 and the ring gear 106 can be operable to lock the drive in either direction. Thus, when no power is applied to the motor 102, pinion 104 will lock with respect to the ring gear 106, thereby holding the relative positions of the input and output shafts.

Pinion bearings 120 can be coupled to pinion 104. Ring gear bearings can be coupled to ring gear 106. Pinion bearings 120 and a ring gear bearings assembly can operate in conjunction with the internal housing case to maintain the integrity of the sealed cavity while allowing for transfer of rotational motion into and out of the sealed cavity. In various embodiments, the pinion bearings can be operable to adjust the positioning of pinion 104 along a pinion axis, and the ring gear bearings can be operable to adjust the positioning of ring gear 106 along a ring gear axis. Oil seals are also provided.

An internal housing case includes a case body, a bore, a ring gear cavity, an output gear shaft cavity, a seal groove, and a lubricant port. The bore, ring gear cavity, and lubricant port are connected to form a lubricant filled cavity. When assembled, a pinion shaft is inserted through the bore, and sealed with threaded spacing adjusters having oil rings such as discussed above. A ring-gear can be inserted into ring gear cavity, sealing the circular opening with a sealed bearing.

The gear motor has four chambers. The chamber enclosing the hypoid gear set is oil bathed with two oil seals to keep the oil in the chamber. The other two chambers with gears in them have an air opening between them and the gears are greased. The hollow output gear 108 also has two oil seals on it to keep the grease in and contaminants outs. The fourth chamber that houses the electric motor is an air chamber. All chambers also incorporate O-rings to seal different parts, and the air chamber has a Gore Tex vent to allow for air movement to equalize pressure resulting from the heating and cooling cycles of the electric motor, that also keeps moisture and other things out of the chamber. An output shaft and bearing can be inserted into output gear shaft cavity. The output gear shaft cavity can be separated and not in fluid communication with ring gear cavity. The opening of ring gear cavity can be sealed by adding a gasket, such as an O-ring, to seal grove and attaching a sealing plate.

External housing case 116 includes a case body. In various embodiments, the internal housing case and the external housing case 116 can be formed from metal, such as aluminum, steel, or the like. Each of internal housing case and external housing case 116 can be machined from a single block, can be formed by stamping and machining, or can be die cast aluminum. The air chamber cover may be injection molded polymer or die cast aluminum.

The electric motor 102 may be a field wound motor or a permanent magnet motor as shown. In one embodiment, the electric motor 102 is a direct current motor that provides seventy ounce-inches of torque at 12,000 rpm, and free runs at 19,000 rpm. Such a motor is available from Chiaphua Components Limited of Hong Kong.

The electric motor 102 receives power from a pair of wires that run to a connector that mates with another connector disposed within a molded, waterproof plug. The plug is friction fit within an opening in external housing case or cover. From the connector, the wires can run to a solid state controller, or to a standard reversing mechanical controller, that can operate the electric motor 102 in any desired manner, including forward or reverse. An expanded polytetrafluoroethylene plug inhibits moisture from penetrating inside the cover, while still allowing the interior to vent to atmosphere.

The electric motor 102 is disposed between a receiver and a pair of clamps, or between motor mounts disposed at each end of the electric motor. The shaft of the motor 102 extends axially into a bore in the pinion shaft to fix those components relative to each other. Tapered roller bearings are disposed on respective regions of the pinion shaft. An oil seal and a nut that also uses an O-ring to seal the outside are also provided. Shims may be used to adjust both the pinion and the ring gears. The shims can be changed to adjust the spacing of the hypoid gear set.

A single start hypoid tooth on pinion shaft engages hypoid teeth on the ring gear. The arrangement of the tapered hypoid pinion with an axis skew to that of the ring gear is sometimes known as a spiroid gear. The ring gear shaft extends through a bore in the ring gear, and has a key slot that accepts a woodruff key to fix the ring gear shaft with respect to the ring gear. One end of the ring gear shaft accepts tapered roller bearings, and extends through the internal housing case. A nut and an adjuster may be disposed on the end of the ring gear shaft, or shims may be used to adjust the clearance of the gear set rather than adjusting nuts. As above, rotation of the pinion adjuster and/or the ring gear adjuster makes minor adjustments in the respective positions of the pinion shaft and the ring gear shaft to optimize contact between the pinion and the ring gear.

In one embodiment, the hypoid tooth has ten diametrical pitch, a high pressure angle of 30° and a low pressure angle of 10°, a sigma of 40°, a conical lead pitch of 5.43 mm, a face angle of 5°, an offset above center of 25.40 mm, a working depth of 4.60 mm, and a lead angle of 6" 37'. The ring gear may have thirty teeth with a diametrical pitch of 10, a shaft angle of 90°, a pressure angle of 20°, a working depth of 4.31 mm, a whole depth of 4.80 mm, a pitch circle diameter of 76.20 mm, and an outside diameter of 76.20 mm. The 30:1 ratio between the pinion and the ring gear allows that high ratio hypoid combination to self lock when the power is turned off to the motor.

The opposite end of the ring gear shaft accepts an oil seal, and extends through a center plate that is preferably extruded aluminum. Teeth on the end of the shaft engage teeth on the output gear. In one embodiment, fourteen teeth are provided with a twenty pitch. One hundred twenty teeth are provided with a similar pitch. The teeth can be either straight or helical, as long as they are the same.

The output gear has a collar that extends through the center plate. The output shaft extends through a bore in the output gear and accepts roller bearings on either side of the output gear. An oil seal is disposed around—the output shaft, and seats in a die cast and machined aluminum bottom plate. A plurality of fasteners around the perimeter of the bottom plate secure a seal against the cover, while another set of fasteners secure the center plate to the internal housing case. In operation, the gear motor may achieve an overall reduction ration in excess of 700:1, and preferably on the order of about 733:1.

The aluminum case and plates act as heat sinks. Raised spacers extend from the bottom plate and support the centerplate, thereby forming space through which air may circulate, either passively by natural convection or actively by forced means. A similar space above the centerplate and between the exterior of the case and the interior of the cover permits a similar airflow.

Figure 4:
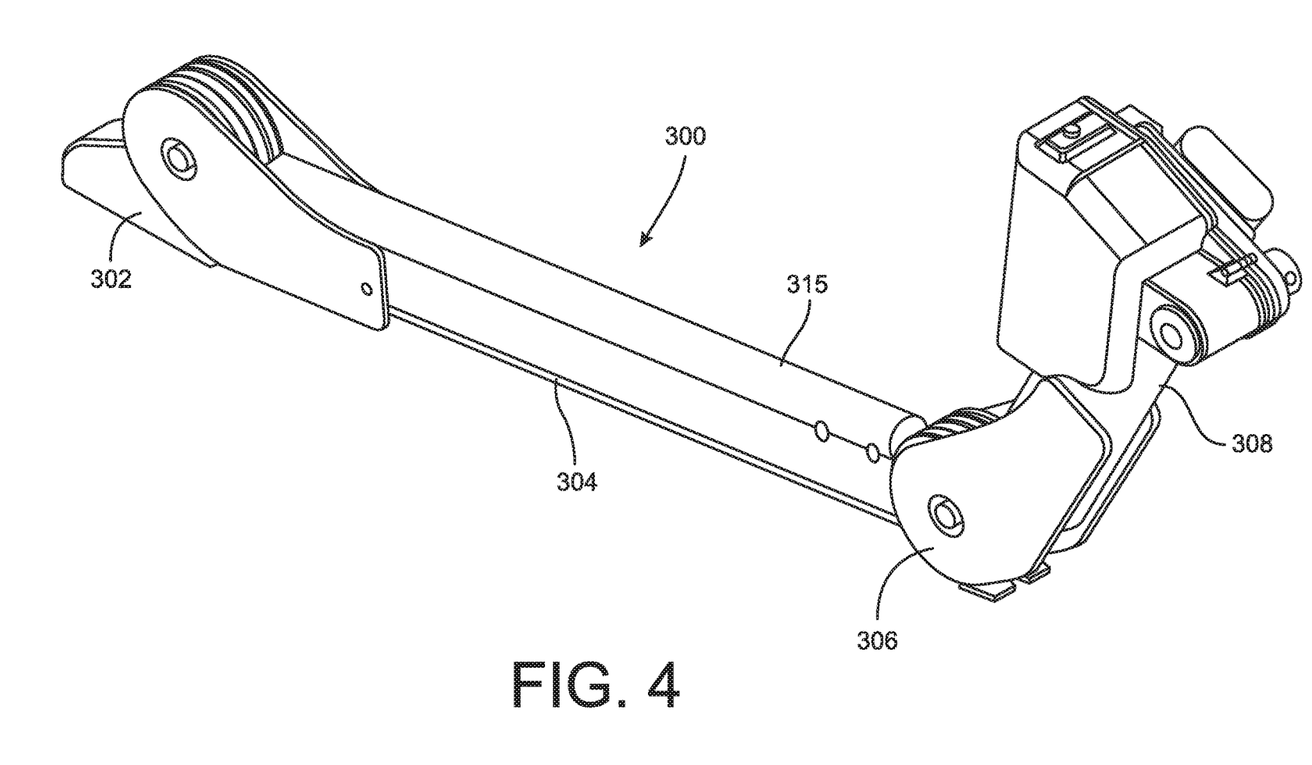
FIG. 4 is a perspective view of an arm assembly according to one aspect of the present disclosure, with the motor of FIGS. 2-3 mounted on its distal end.
Figure 5:
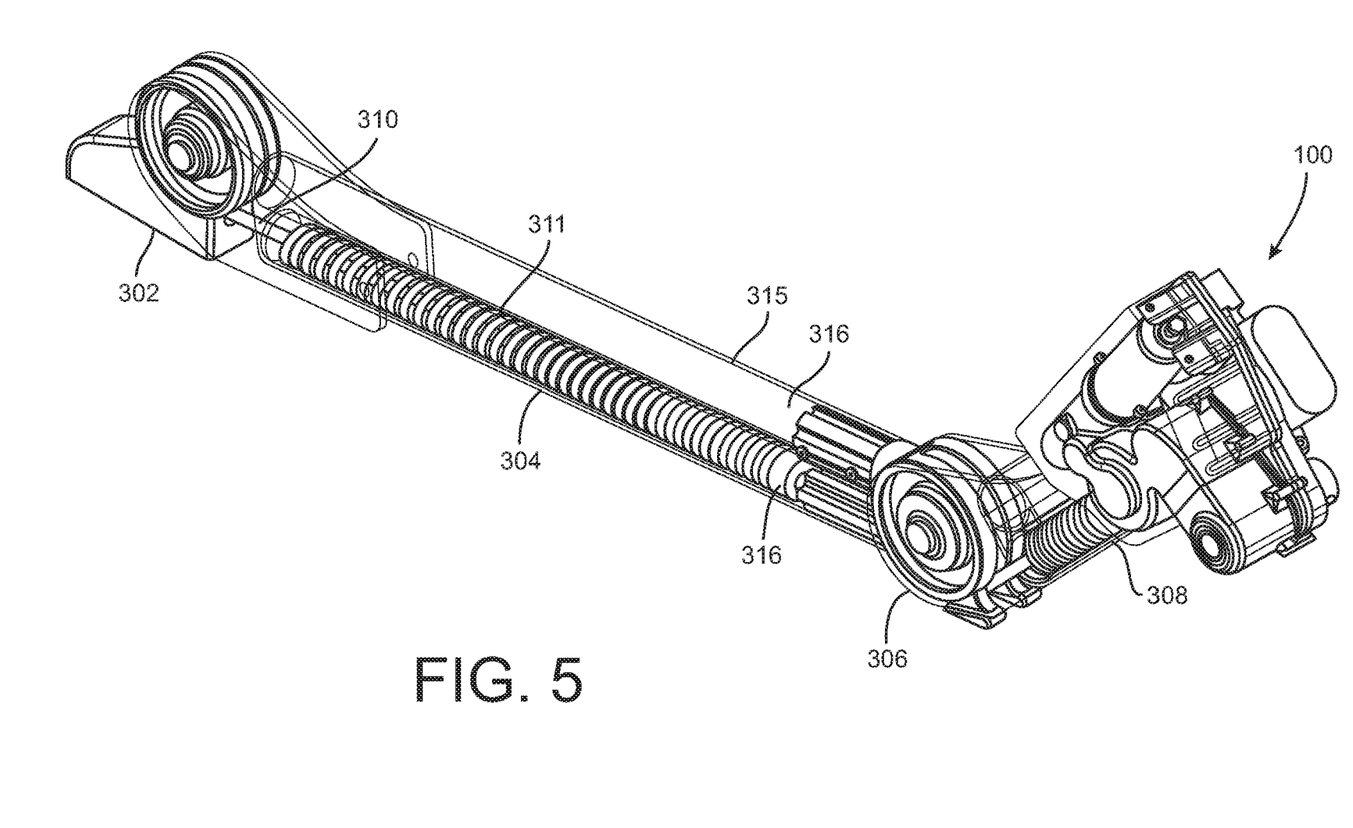
FIG. 5 is a perspective cut-away view of the arm assembly shown in FIG. 4.

FIGS. 4-5 show an arm assembly for use with the cover system, such as the cover system 10 shown in FIG. 1. The arm assembly incorporates a cable operated spring powered pivot, which can be the arm assembly disclosed in commonly-owned co-pending application Ser. No. 15/252,831 (the '831 Application), filed on Aug. 31, 2016, and entitled "Cover System for an Open Topped Container". The entire disclosure of the '831 Application is incorporated herein by reference, particularly the description of the arm assembly 10 in that application. The arm assembly of the '831 Application includes pivots that use compression springs that can be custom made or stacked versions of an off the shelf die spring. As shown generally in FIG. 4, the arm assembly 300 includes a base 302, an arm 304, a knuckle 306 and an extension 308. The motor 100 may be mounted on the distal end of the extension 308. Both the base 302 and the knuckle 306 are cable operated, by cable 310, and spring powered, by spring 311, as particularly shown in FIG. 5. As discussed in detail in the '831 Application, the base 302 may be made in different sizes to provide different power ranges, each of which can be adjusted by the power of the spring or springs used.

Figure 6:
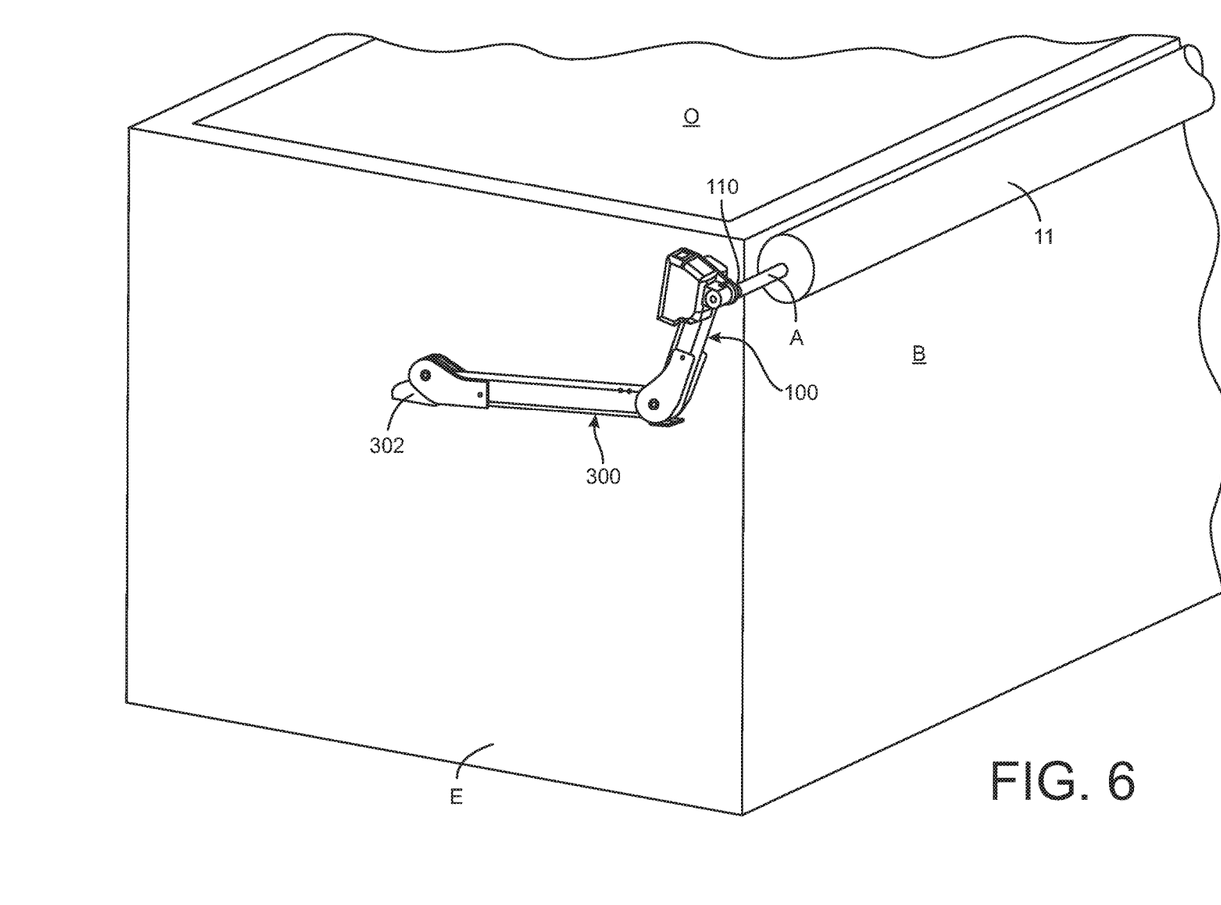
FIG. 6 is a perspective view of a cover system according to the present disclosure mounted to a trailer body, such as the cover system and trailer body shown in FIG. 1

The arm 304 includes an elongated housing 315 which defines two parallel channels 316. The cable 310 and spring 311 reside in one channel for the arm assembly 300 that operates as the drive assembly for the cover system, such as the drive assembly 12 in FIG. 1. The arm assembly 300 and motor 100 are shown in more detail in FIG. 6 mounted to an end wall E of the trailer body B. The output shaft 110 of the drive motor is coupled to the axle A of the cover 11 so that the drive motor can rotate the cover as described above.

Figure 7:
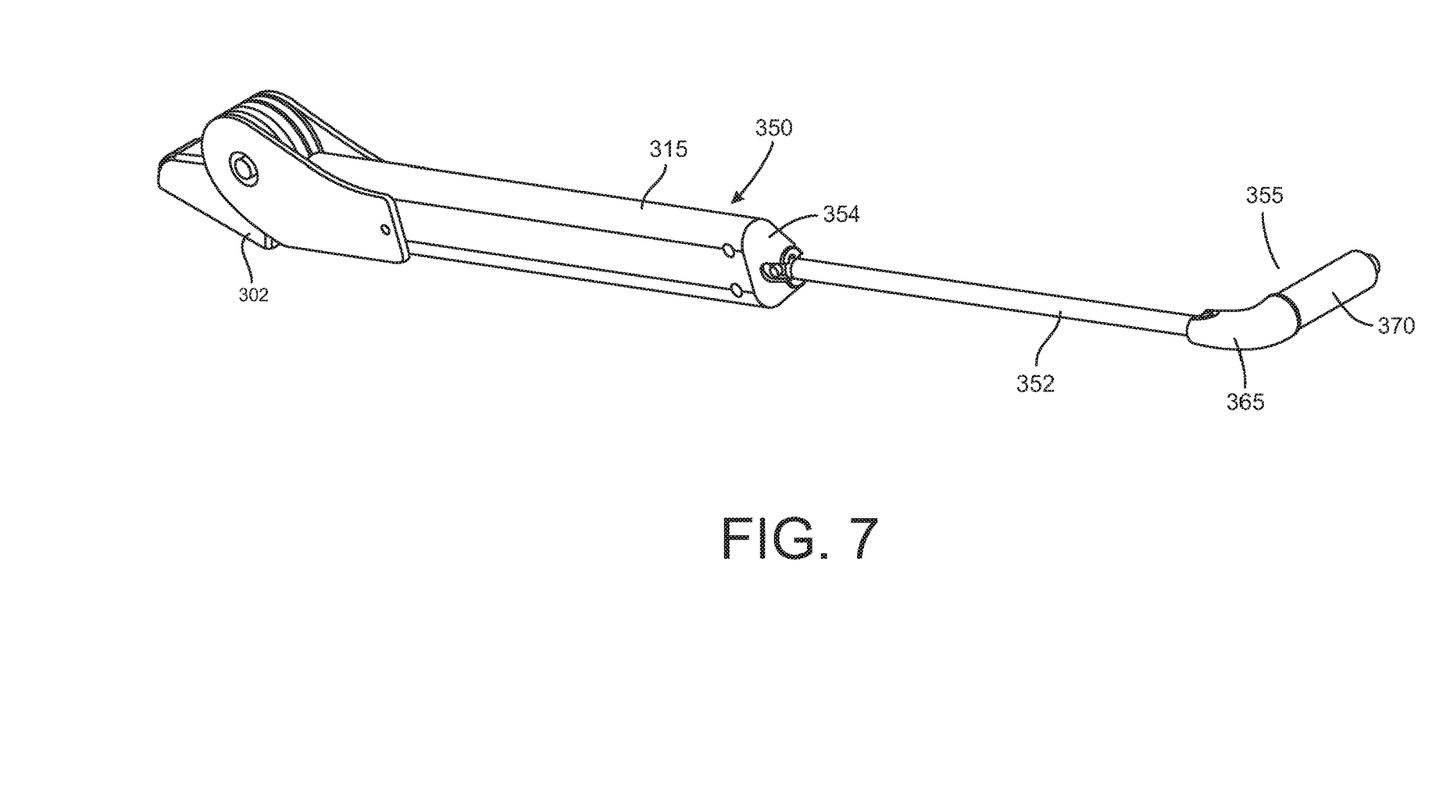
FIG. 7 is a perspective view of the rear pivot arm assembly for use as the rear support assembly for the cover system, such as the rear support assembly shown in FIG. 1.
Figure 8:
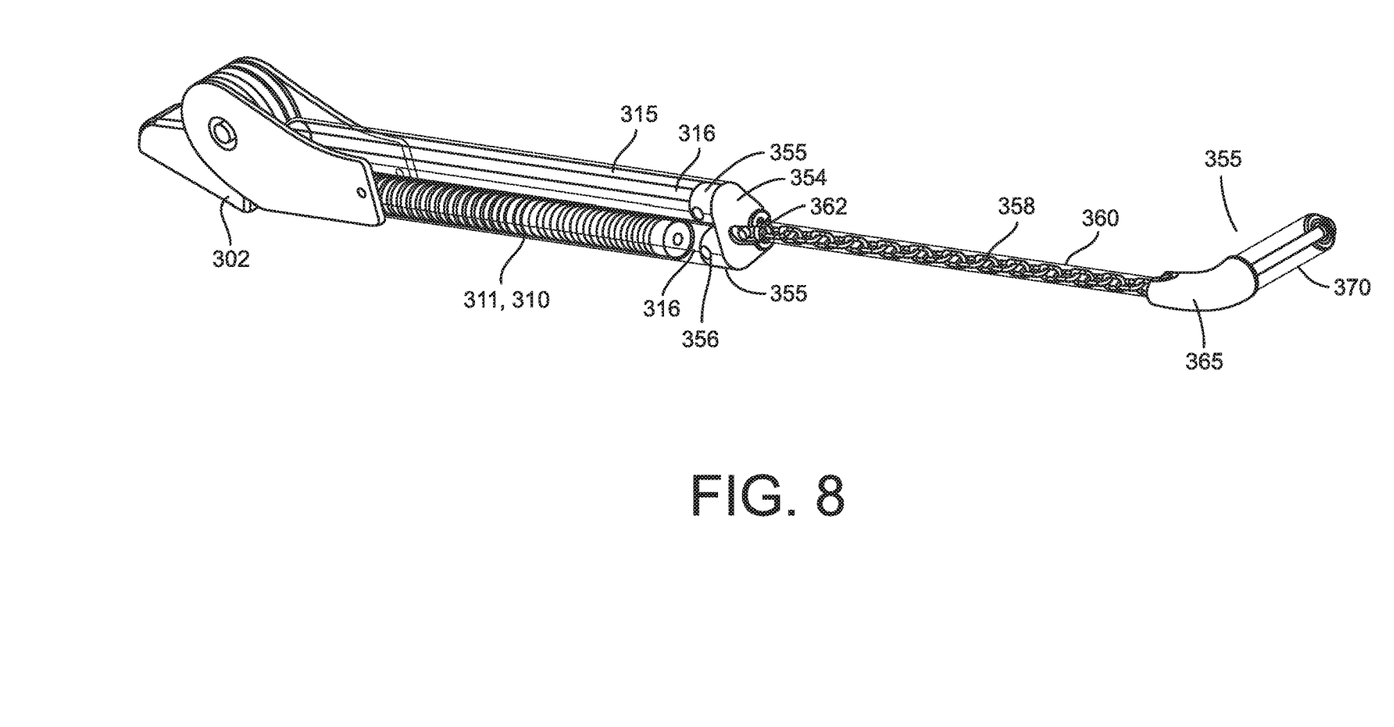
FIG. 8 is a partial cutaway perspective view of the rear pivot arm assembly shown in FIG. 7.
Figure 9:
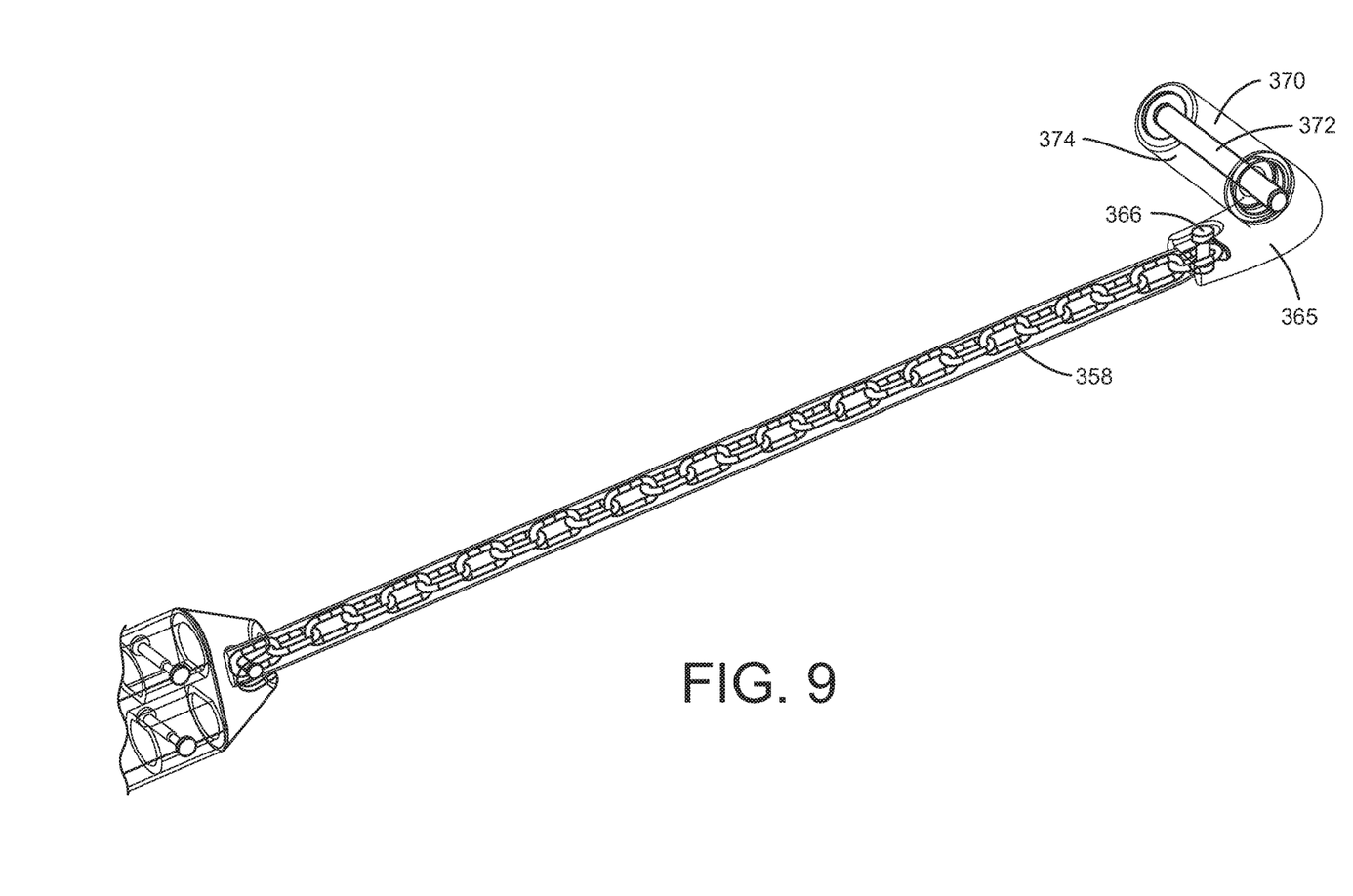
FIG. 9 is a further partial cutaway perspective view of the rear pivot arm assembly shown in FIG. 7.

FIGS. 7-9 show a rear multiflex pivot arm assembly 350 that may be deployed with the systems and components described above. In particular, the assembly 350 may operate as the support mechanism 13 at the opposite or forward end of the cover system 10. The pivot arm assembly 350 need not include a drive motor, as with the drive mechanism 12 and arm assembly 300 shown in FIG. 6. The rear pivot arm assembly 350 can include the same base 302 and housing 315 of the arm assembly 300. The rear pivot arm assembly 350 may also be configured to generate torque to assist movement of the rear pivot arm assembly 350 as the cover is deployed and retracted. In one embodiment, the arm assembly can incorporate the spring and cable 311, 310, as shown in FIG. 8. The spring and cable 311, 310 of the rear pivot arm assembly 350 should match the spring and cable of the forward drive mechanism 12 or arm assembly 300 to ensure that the cover C is deployed/retracted uniformly across the width of the container. Alternatively, the rear pivot arm assembly 350 can incorporate another torque generation element or spring element between the housing 315 and the base 302, such as a torsion spring, a double-coil spring, or similar spring component.

The rear pivot arm assembly 350 includes a flexible link 352 that is pivotably fastened to a mounting base 354. As shown in detail in FIGS. 8-9, the mounting base 354 includes two hubs 355 that fit into a corresponding channel 316. The hubs 355 may be fastened by set screws 356. The flexible link 352 includes a chain 358 encased in an outer sheath 360. The chain may be a standard chain with multiple links extending the length of the flexible link 352. The chain is preferably formed of a high-strength material, such as steel. The outer sheath 360 is formed of a flexible but resilient material, such as a flexible plastic. The chain 358 is engaged to a hasp 362 fixed to the mounting base 354.

The flexible link 352 is fixed at one end to the mounting base 354 and includes an engagement element 355 at its opposite end configured to be coupled to the cover assembly. The engagement element 355 includes an elbow joint 365 at the opposite end of the flexible link. The elbow joint 365 includes a mounting bolt 366 for engaging the end link of the chain 358, as shown in FIG. 9. The elbow joint 365 preferably forms a right angle joint between the flexible link 352 and a bushing assembly 370 that is configured to be fixed within the roller of the cover. The bushing assembly 370 is fastened to the elbow joint 365 by a bolt arrangement 372 so that the bushing assembly can rotate with the roller of the cover. The bushing assembly includes a cylindrical bushing 374 that may be formed of a suitable polymer material.

The rear pivot arm assembly 350 is mounted to the end wall E of the trailer body B at the end of the trailer opposite the drive mechanism 12 or arm assembly 300. It can be appreciated that the rear pivot arm assembly 350 may be used with drive assemblies other than the arm assembly 300 described herein. As the drive assembly rotates the roller of the cover, the cover advances across the end caps of the trailer body. The roller is connected to the bushing assembly 370 so that movement of the roller and cover 11 across the trailer body draws the flexible link 352 with it, thereby pivoting the rear pivot arm assembly 350. The rear pivot arm assembly is generally passive in that it does not generate a rotational force to the forward end of the cover roller. However, the addition of the spring and cable to the rear pivot system provides enough tension to the flexible link 352 to keep the link taut during operation, and thereby help maintain uniform movement of the roller and cover.

All of the parts of the rear multiflex pivot arm assembly 350 are less than three inches wide, or project less than three inches from the rear wall of the trailer body. The assembly 350 has a length sufficient to span the mounting location of the base 302 on the end wall E of the trailer to the axle or roller of the cover system. Preferably, the length of the assembly 350 matches length of the drive mechanism 12 so that the cover rolls and unrolls evenly. The flexible link 352 and chain 358 can have a length of 10-50 inches, depending on the height of the trailer body and the presence of a door or gate at the end wall of the trailer body. The chain 358 allows the flexible link 352 to flex in multiple directions at the same time as needed, so the rear pivot arm assembly 350 is well-suited for use with opening tailgates. In this application of the rear pivot arm assembly, the rear pivot arm assembly would be mounted to the rear of the trailer body while the drive mechanism would be mounted to the front of the trailer body. This feature of the rear multiflex pivot arm assembly 350 accommodates swing doors, flip up tail gates, and even high lift gates. The length of the flexible link can be adjusted simply by removing links from the chain 358.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A cover system for an open-topped container body, comprising:
   an elongated cover assembly sized and configured to span a length of the open top of the container and to span the width of the open top of the container in a deployed position;
   a first arm assembly pivotably mountable at one end of the container body, the arm assembly configured to be coupled to one end of the cover assembly and including a drive motor for rotating the cover assembly between a deployed position spanning the width of the open top and a retracted position in which the open top is open; and
   a second arm assembly mountable at an opposite end of the container body, the second arm assembly including an elongated arm pivotably mountable at one end thereof to the container body, a chain, having chain links, connected at one end thereof to the opposite end of the arm, and an engagement element connected at an opposite end of the chain and configured to be coupled to an opposite end of the cover assembly.

2. The cover system of claim 1, wherein the elongated arm includes a torque generation element operable to apply a force to pivot the elongated arm.

3. The cover system of claim 2, wherein the torque generation element includes a spring element.

4. The cover system of claim 1, wherein:
   the elongated arm includes an elongated housing defining at least one bore therein; and
   the chain includes a mounting base configured to be at least partially seated within said bore.

5. The cover system of claim 4, wherein said mounting base includes a hasp affixed thereto, said hasp engaged to a link at said one end of said chain.

6. The cover system of claim 1, wherein said chain is substantially encased within a flexible sheath.

7. The cover system of claim 6, wherein said flexible sheath is formed of a flexible plastic.

8. The cover system of claim 1, wherein said engagement element includes an elbow joint fastened to a link at said opposite end of the chain.

9. The cover system of claim 8, wherein said elbow joint forms a right angle.

10. The cover system of claim 8, wherein said engagement element includes a bushing assembly mounted to said elbow joint, said bushing assembly configured to be coupled to said opposite end of the cover assembly.

11. A pivot arm assembly for a cover system for an open-topped container body, comprising:
    a first arm assembly pivotably mountable at one end of the container body, the arm assembly configured to be coupled to one end of the cover system and including a drive motor for rotating the cover system between a deployed position spanning the width of the open top and a retracted position in which the open top is open; and
    a second arm assembly mountable at an opposite end of the container body, the second arm assembly including an elongated arm pivotably mountable at one end to the container body, a chain, having chain links, connected at one end thereof to an opposite end of the arm, and an engagement element connected at an opposite end of the chain and configured to be coupled to an opposite end of the cover system.

12. The pivot arm assembly of claim 11, wherein the elongated arm includes a torque generation element operable to apply a force to pivot the elongated arm.

13. The pivot arm assembly of claim 12, wherein the torque generation element includes a spring element.

14. The pivot arm assembly of claim 11, wherein:
    the elongated arm includes an elongated housing defining at least one bore therein; and
    the chain includes a mounting base configured to be at least partially seated within said bore.

15. The pivot arm assembly of claim 14, wherein said mounting base includes a hasp affixed thereto, said hasp engaged to a link at said one end of said chain.

16. The pivot arm assembly of claim 11, wherein said chain is substantially encased within a flexible sheath.

17. The pivot arm assembly of claim 16, wherein said flexible sheath is formed of a flexible plastic.

18. The pivot arm assembly of claim 11, wherein said engagement element includes an elbow joint fastened to a link at said opposite end of the chain.

19. The pivot arm assembly of claim 18, wherein said elbow joint forms a right angle.

20. The pivot arm assembly of claim 18, wherein said engagement element includes a bushing assembly mounted to said elbow joint, said bushing assembly configured to be coupled to said opposite end of the cover assembly.

21. A pivot arm assembly for a cover system for an open-topped container body, comprising:
    a first arm assembly pivotably mountable at one end of the container body, the arm assembly configured to be coupled to one end of the cover system and including a drive motor for rotating the cover system between a deployed position spanning the width of the open top and a retracted position in which the open top is open; and
    a second arm assembly mountable at an opposite end of the container body, the second arm assembly including an elongated arm pivotably mountable at one end to the container body, a chain, having chain links, connected at one end thereof to an opposite end of the arm, and an engagement element connected at an opposite end of the chain and configured to be coupled to an opposite end of the cover system, wherein said engagement element includes a right-angle elbow joint fastened to a link at said opposite end of the chain.

22. The pivot arm assembly of claim 21, wherein the elongated arm includes a torque generation element operable to apply a force to pivot the elongated arm.

23. The pivot arm assembly of claim 21, wherein said chain is substantially encased within a flexible sheath.

24. The pivot arm assembly of claim 21, wherein said engagement element includes a bushing assembly mounted to said elbow joint, said bushing assembly configured to be coupled to said opposite end of the cover assembly.

* * * * *